United States Patent [19]
Devarney

[11] Patent Number: 5,874,895
[45] Date of Patent: Feb. 23, 1999

[54] METHOD AND APPARATUS FOR TESTING OPERATION OF A SENSOR CONTROLLED DEVICE

[75] Inventor: Craig Neil Devarney, Essex Junction, Vt.

[73] Assignee: International Business Machines Corporation, Armonk, N.Y.

[21] Appl. No.: 752,458

[22] Filed: Nov. 15, 1996

[51] Int. Cl.[6] .................................................. G08B 29/00
[52] U.S. Cl. ........................ 340/514; 340/515; 340/501; 324/523; 364/481; 364/551.01
[58] Field of Search .................................. 340/514, 501, 340/511, 515, 664, 870.01, 870.02, 870.39; 324/523, 527, 500, 511, 522; 364/152, 158, 159, 481, 483, 551.01

[56] References Cited

U.S. PATENT DOCUMENTS

| | | | |
|---|---|---|---|
| 3,970,929 | 7/1976 | Borucki et al. | 324/73 R |
| 4,224,606 | 9/1980 | Bartles | 340/514 |
| 4,300,205 | 11/1981 | Tansuwan | 364/578 |
| 4,414,837 | 11/1983 | Bice et al. | 731/1 B |
| 4,497,242 | 2/1985 | Moyer | 98/115.3 |
| 4,565,963 | 1/1986 | Shaw | 32/51 |
| 4,595,914 | 6/1986 | Siegel | 340/515 |
| 4,680,537 | 7/1987 | Miller | 324/500 |
| 4,922,194 | 5/1990 | Gaussa et al. | 324/158 R |
| 5,090,303 | 2/1992 | Ahmed | 454/58 |
| 5,121,101 | 6/1992 | Jakubowski et al. | 340/515 |
| 5,164,901 | 11/1992 | Blackburn et al. | 364/424.05 |
| 5,459,449 | 10/1995 | Ravas et al. | 340/438 |
| 5,532,675 | 7/1996 | White | 340/515 |

FOREIGN PATENT DOCUMENTS 0 418 488 A1  3/1991  European Pat. Off. .

OTHER PUBLICATIONS

"Exhuast Flow Monitoring System," *Research Disclosure*, Apr. 1990, No. 312.

*Primary Examiner*—Jeffery A. Hofsass
*Assistant Examiner*—Daryl C. Pope
*Attorney, Agent, or Firm*—James M. Leas

[57] ABSTRACT

The present invention is directed to a method and apparatus for testing the operation of a sensor controlled monitor device by using a test device connected in parallel to the monitor device. When activated, the test device sinks a current signal, representing a parameter to be monitored, in a steadily changing, calibrated manner, causing an input to the monitor device to vary, thus permitting the monitor device to respond to the varied signal to calibrate or test alarm settings and function. The present invention permits easy confirmation of the monitor device's gain adjustment, zero adjustment, and setpoint adjustment. In addition, there is no need to physically disconnect the transmitting sensor circuit or to physically change the amount of the substance being monitored. There is also no need to disturb any wiring of existing circuits.

28 Claims, 3 Drawing Sheets

METHOD AND APPARATUS FOR TESTING OPERATION OF A SENSOR CONTROLLED DEVICE

FIELD OF THE INVENTION

The present invention relates to the field of sensor controlled devices, and, more particularly, to a method and apparatus for testing the operation of a sensor controlled device that receives analog current from a transmitting sensor circuit.

BACKGROUND OF THE INVENTION

Many monitor systems use an analog current transmitting sensor circuit in combination with a monitor or control circuit. For example, FIG. 1 illustrates a prior art monitor system 10 wherein exhaust flow 12 is monitored by a sensor, in this case pressure sensing current transmitter 14. Transmitted current 16 is proportional to the amount of exhaust 12, and is provided to exhaust display and monitor circuit 18. Monitor circuit 18 is a sensor controlled device which monitors and displays the exhaust level on exhaust display 19, and provides control of alarm 23 and other control circuits via a configurable exhaust level setpoint. A user may configure the exhaust level setpoint to trigger alarm 23 if the exhaust level drops below a certain point.

For system 10 of FIG. 1 to work correctly, monitor circuit 18 needs to have three configurable functions working properly: gain adjustment 25, zero adjustment 27, and setpoint adjustment 29. Gain adjustment 25 and zero adjustment 27 justify the exhaust display with the actual signal range provided by the monitored exhaust. Setpoint adjustment 29 determines the minimum exhaust level that will trigger alarm 23 and shut off controls.

To test prior art system 10 requires physically disconnecting sensor 14. There is then no transmitted current 16 flowing to monitor circuit 18. As far as monitor circuit 18 is concerned, this is equivalent to no exhaust flow 12. This triggers alarm 23, and provides the check that monitor system 10 is working correctly. Alternately, monitor system 10 may be tested by actually turning off exhaust flow 12.

The problem with this method of testing is that it only provides an on/off test. It does not test the calibration of monitor circuit 18, and does not indicate the exhaust level setpoint for alarm 23. In addition, both types of tests, physically removing sensor 14, or turning off exhaust flow 12, are often impractical and time-consuming.

Consequently, it would be desirable to have a method and apparatus for testing a sensor controlled monitor device that tests the calibration, as well as the exact value of any setpoints, of the monitor device. It would also be desirable to have a method and apparatus that are easy to use, and do not require physically disconnecting the transmitting sensor circuit or physically changing the amount of the substance being monitored.

SUMMARY OF THE INVENTION

Accordingly, the present invention is directed to a method and apparatus for testing the operation of a sensor controlled monitor device by using a test device connected in parallel to the monitor device. When activated, the test device sinks a current signal, representing a parameter to be monitored, in a steadily changing, calibrated manner, causing an input to the monitor device to vary, thus permitting the monitor device to respond to the varied signal to calibrate or test alarm settings and function.

It is an advantage of the present invention that confirmation of the gain adjustment, zero adjustment, and setpoint adjustment is achieved. Another advantage of the present invention is that there is no need to physically disconnect the transmitting sensor circuit or to physically change the amount of the substance being monitored. It is a further advantage of the present invention that connecting a test device in parallel to a monitor device allows testing to take place without disturbing any wiring of existing circuits.

DETAILED DESCRIPTION OF A PREFERRED EMBODIMENT OF THE INVENTION

Figure 1:
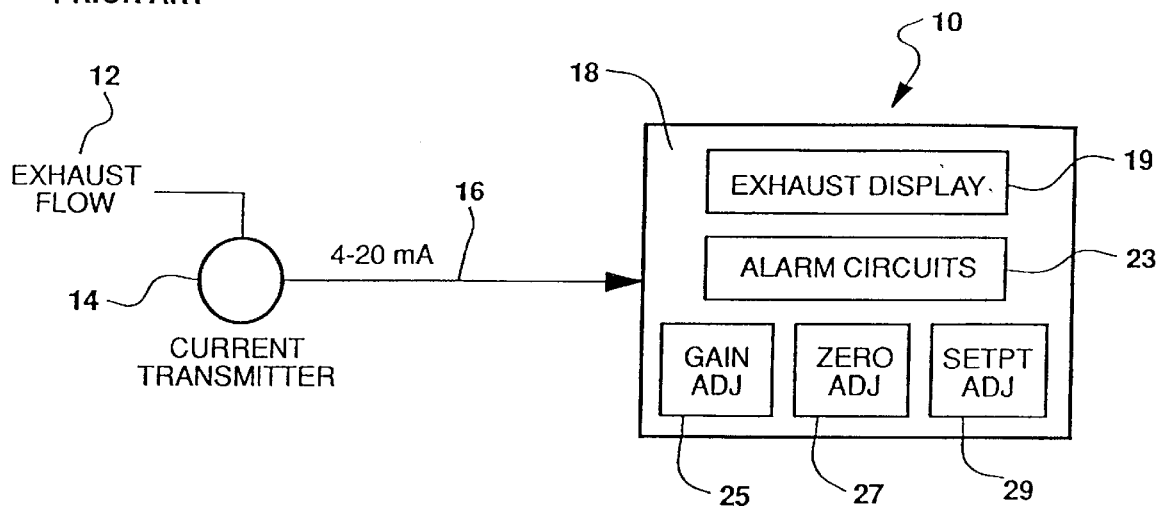
FIG. 1 is a block diagram of a prior art monitor system.
Figure 2:
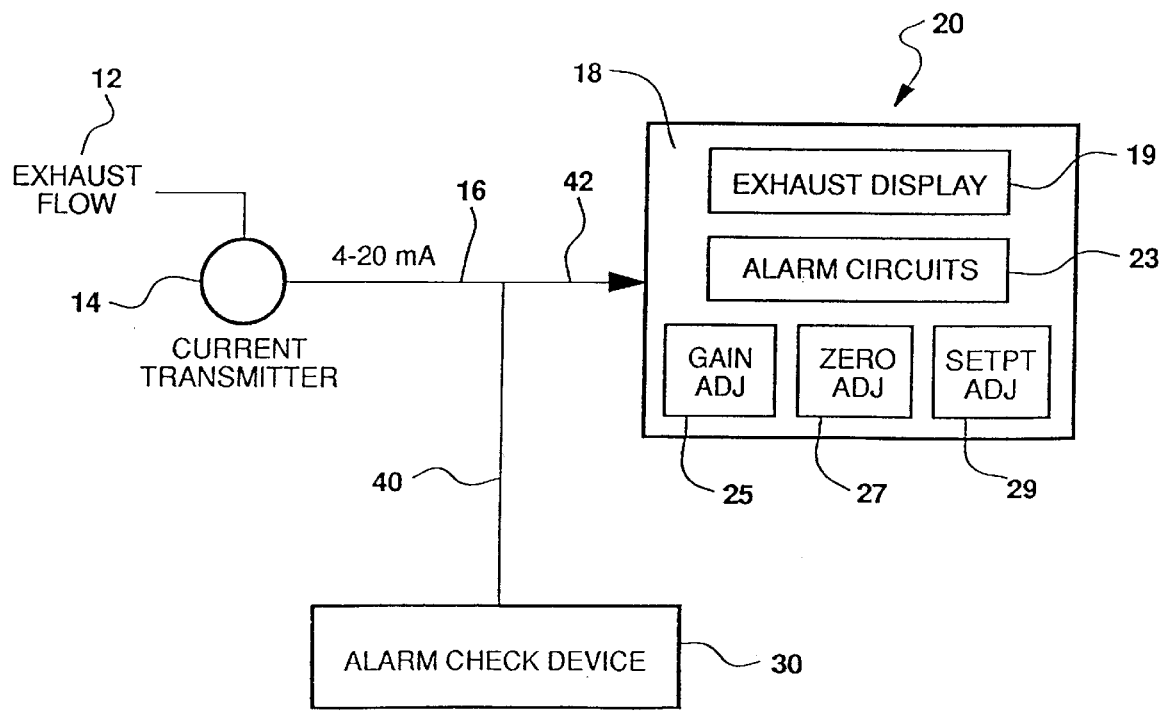
FIG. 2 is a block diagram of a monitor system according to the present invention.

FIG. 2 is a block diagram of a monitor system 20 according to the present invention. Monitor system 20 monitors exhaust flow 12 in a manner similar to monitor system 10 of FIG. 1. Exhaust flow 12 is monitored by a sensor, in this case pressure sensing current transmitter 14. Pressure sensing current transmitter 14 is an example of a sensor that may be used in the present invention. Other sensors, including, but not limited to weight, pressure, decibel, temperature, fluid level, light, and color sensors may be used. Current output 16 of transmitter 14 is proportional to the amount of exhaust 12, and is provided to a sensor controlled device, in this case monitor circuit 18. Monitor circuit 18 monitors and displays the exhaust level, and provides control of alarm 23 and other control circuits via a configurable parameter setpoint. Gain adjustment 25, zero adjustment 27, and setpoint adjustment 29 work as described in FIG. 1.

Alarm check device 30 connects in parallel to monitor circuit 18. When activated, alarm check device 30 "sinks" current signal 16 away from monitor circuit 18 at a steady rate. This results in current 40 flowing to alarm check device 30, and current 42 flowing to monitor circuit 18. As current 40 increases, current 42 decreases proportionally. This allows for confirmation of gain adjustment 25, zero adjustment 27, and setpoint adjustment 29. In addition to providing a more thorough review of monitor circuit 18, alarm check device 30 eliminates any physical disconnection of monitor equipment, or any physical changes to exhaust flow 12 (such as turning off the actual exhaust).

Figure 3:
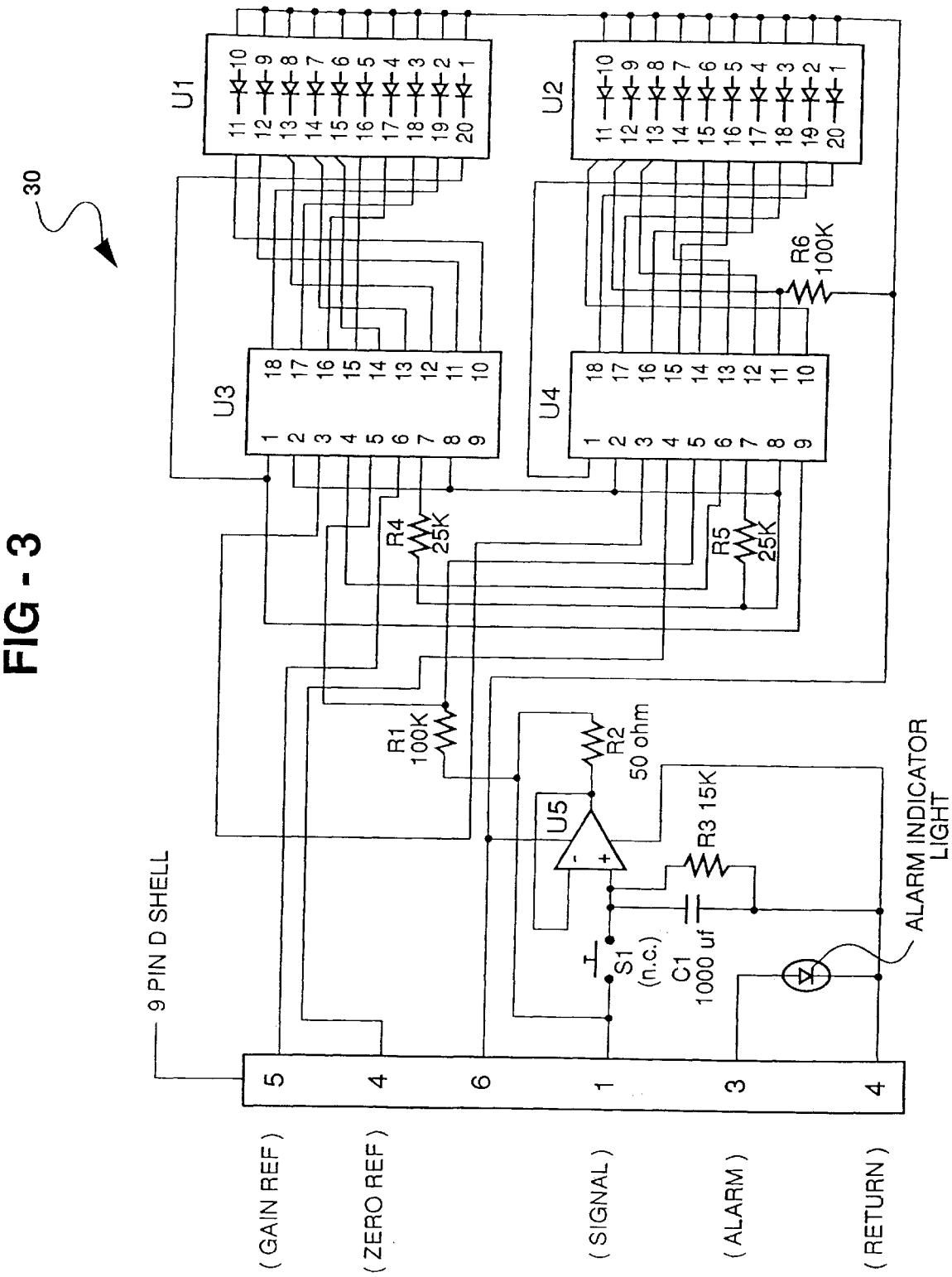
FIG. 3 is a circuit diagram of a test device according to the present invention.

Referring now to FIG. 3, a circuit diagram giving further details of alarm check device 30 of FIG. 2 will be described. In the preferred embodiment of the invention, alarm check device 30 is connected to monitor circuit 18. IBM exhaust monitor board, part number 82F0880, is used to monitor toxic exhaust ducts, and is an example of a typical monitor circuit 18. Monitor circuit 18 has an analog output of 2 volts at zero cfm (cubic feet per minute) and 3–15 volts at full exhaust, generated by a 4–20 milliamp capacitive manometer. When attached to monitor circuit 18, alarm check device 30 simulates full scale, zero, and alarm operation.

When connected to monitor circuit 18, capacitor C1 charges up to a level equal to an analog exhaust signal.

When switch S1 is pressed, op amp U5 "sinks" the signal at a rate determined by capacitor C1 and resistor R3. This creates a slow elimination of sensor 14's output, which is visible on both monitor circuit 18 and alarm check device display U1, U2 (note that U3 and U4 are the display drivers associated with display devices U1 and U2). Monitor circuit 18 contains a light-emitting diode (LED) bar graph (not shown), which denotes exhaust flow 12 in percentages. This LED bar graph shows the decrease in exhaust flow 12 as the present invention sinks current 16 from monitor circuit 18.

Visual confirmation of exhaust circuit 18's gain adjustment 25, zero adjustment 27, and setpoint adjustment 29 is easily performed. Gain adjustment 25 and zero adjustment 27 are determined by potentiometers on monitor circuit 18. Setpoint adjustment 29 is selected by closure of one of sixteen possible configure switches (not shown) on monitor circuit 18. The switches represent a range from 20% to 100% in 5% increments.

Figure 4:
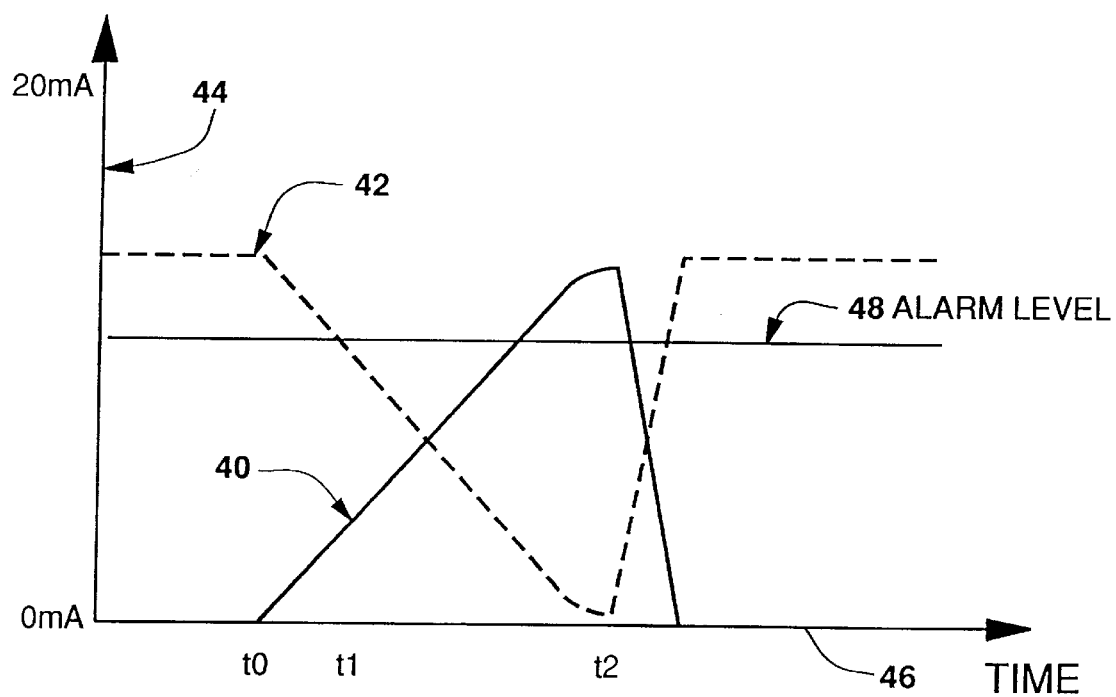
FIG. 4 is a waveform diagram of a variable current sink waveform at an input of an alarm check device, and the corresponding input signal to a monitor device, according to the present invention.

Referring now to FIG. 4, a waveform diagram of the current input to alarm check device 30 (depicted as solid line 40), and the resulting current signal to monitor circuit 18 (depicted as dashed line 42), will be described. Current level is measured on the vertical axis 44, while time is measured on the horizontal axis 46. At time t0, current 40 flowing to alarm check device 30 is at an initial level of zero milliamps.

As time progresses, current flow 40 to alarm check device 30 increases in a steady manner, thus causing a corresponding decrease in current flow 42 to monitor circuit 18. At time $t_1$ in this example, monitor circuit 18 should indicate that an alarm condition exists, as current flow 42 to monitor circuit 18 has dropped below predetermined alarm level 48. At some point, $t_2$ in this particular example, current 40 flowing to alarm check device 30 reaches a maximum amount approximately equal to current 16, and current 42 flowing to monitor circuit 18 reaches a minimum amount. At this point, the test may be concluded, or as shown, current 40 flowing to alarm check device 30 may continue to be varied.

The preferred embodiment of the present invention concerns the actuation of alarm and control circuits when a current signal proportional to a measured exhaust varies outside a predetermined range. The present invention is not limited to this specific embodiment, but may be used with any analog current transmitting sensor circuit to confirm that monitor and control circuits respond correctly through the entire range of current signal.

For example, the present invention can be used to test a pressure signal used to control gas delivery, wherein a current transmitting gas pressure transducer feeds an analog signal into a controller. The controller monitors the signal, displays the pressure, and controls, via valving, the source of the gas. When the pressure is too low, the controller should switch delivery, via control valves, to a new source. The present invention can be used to ensure that the "switch over" works at the correct level without disturbing the gas sensor or the wiring.

The present invention can also be used to test a control via weight transducer system, wherein liquefied chemical containers are on current transmitting scales that monitor the quantity of chemical available for use. It is desirable to ensure that the control hardware works properly in response to a low amount of chemical or a quick reduction in chemical weight, caused by a leak. The present invention can be used to test the system without changing the weight of the chemical container, which would be impractical, or disturbing the transducer or the wiring.

In any equipment that contains many sensors, it is impractical to test all of the sensors, and undesirable to disturb connections. The present invention can be permanently installed to all current transmitting transducers, and a selection switch or switches can be used to selectively test one or more sensors. This would enable complete operational testing of sensor intensive equipment. It would also enable remote testing.

Although the present invention and its advantages have been described in detail, it should be understood that various changes, substitutions and alterations can be made herein without departing from the spirit or scope of the invention as defined in the appended claims.

What is claimed is:

1. A method for testing, comprising the steps of:
   providing a sensor;
   providing a sensor controlled device that receives a non-zero current signal from said sensor in normal operation;
   providing said non-zero current signal from said sensor to said sensor controlled device;
   varying said signal for testing, wherein said sensor controlled device and said sensor remain connected during said testing wherein the varying step includes diverting a controlled portion of said signal to a test circuit; and
   monitoring said sensor controlled device when said signal is varied.

2. The method for testing according to claim 1, wherein during the varying step, diverting a controlled portion of the signal comprises the steps to:
   steadily increasing a first portion of said signal diverted to said test control circuit; and
   steadily decreasing a second portion of said signal to said sensor controlled device.

3. The method for testing according to claim 2, wherein the step of steadily decreasing a second portion of said signal comprises the step of linearly decreasing said second portion of said signal to said sensor controlled device.

4. The method for testing according to claim 1, wherein the monitoring step further comprises the step of adjusting one or more response points to said varied signal, wherein each response point occurs at a desired level of said varied signal.

5. The method for testing according to claim 4, wherein the one or more response points comprise a gain adjustment, and a setpoint adjustment.

6. The method for testing according to claim 1, wherein the moinitoring step further comprises the step of detecting an alarm.

7. The method for testing according to claim 1, wherein the moinitoring step further comprises the step of actuating a component of said sensor controlled device.

8. The method for testing according to claim 1, wherein said sensor controlled device comprises an exhaust display, alarm circuits, a gain adjustment, a zero adjustment, and a setpoint adjustment.

9. The method for testing according to claim 1, further comprising the step of providing a monitor circuit for monitoring said sensor controlled device when said signal is varied.

10. The method for testing according to claim 1, wherein said test control circuit comprises a voltage following op amp.

11. A device for testing operation of a sensor controlled device comprising:
    a sensor;
    a sensor controlled device that receives a non-zero current signal from said sensor in normal operation;

means for varying said signal for testing wherein the varying step includes diverting a controlled portion of said signal to a test circuit; and means for monitoring said sensor controlled device when said signal is varied wherein said sensor controlled device and said sensor remain connected during testing.

12. The device for testing according to claim 11, wherein the means for diverting comprises:

means for steadily increasing a first portion of said signal diverted to said test control circuit; and means for steadily decreasing a second portion of said signal to the sensor controlled device.

13. The device for testing according to claim 12, wherein the means for steadily decreasing a second portion of said signal comprises means for linearly decreasing said second portion of said signal to the sensor controlled device.

14. The device for testing according to claim 11, wherein the means for monitoring comprises means for adjusting one of more response points to said varied signal, wherein each response point occurs at a desired level of said varied signal.

15. The device for testing according to claim 14, wherein the one or more response points comprise a gain adjustment, a zero adjustment, and a setpoint adjustment.

16. The device for testing according to claim 11, wherein the means for monitoring further comprises means for detecting an alarm.

17. The device for testing according to claim 11, wherein the means for monitoring further comprises means for actuating a component of said sensor controlled device.

18. The device for testing according to claim 11, wherein said sensor controlled device comprises an exhaust display, alarm circuits, a gain adjustment, a zero adjustment, and a setpoint adjustment.

19. The device for testing according to claim 11, wherein said means for varying includes a voltage following op amp.

20. The device for testing according to claim 11, wherein said device for testing is connected in parallel with the sensor controlled device.

21. A device for testing according to claim 11, further comprising a monitor circuit for monitoring said sensor controlled device when said signal is varied.

22. A device for testing according to claim 11, wherein said test control circuit comprises a current diverter.

23. A device for testing operation of a sensor controlled device comprising:

a sensor;

a sensor controlled device connected to said sensor, there being a non-zero current signal wherein said test control circuit includes means for diverting a controlled portion of said signal; between said sensor and said sensor controlled device in normal operation; and a test control circuit for varying said signal wherein said sensor controlled device and said sensor remain connected during testing.

24. The device for testing according to claim 23, wherein said test control circuit includes a voltage following op amp.

25. The device for testing according to claim 23, wherein the sensor controlled device comprises an exhaust display circuit, alarm circuits, a gain adjustment circuit, a zero adjustment circuit, and a setpoint adjustment circuit.

26. The device for testing according to claim 23, wherein said test control circuit is connected in parallel with the sensor controlled device.

27. A device for testing according to claim 23, further comprising a monitor circuit for monitoring said sensor controlled device when said signal is varied.

28. A device for testing according to claim 23, wherein said test control circuit comprises a current diverter.

* * * * *